(12) United States Patent
Fujiwara

(10) Patent No.: US 9,829,053 B2
(45) Date of Patent: Nov. 28, 2017

(54) ONE-WAY CLUTCH AND ONE-WAY CLUTCH UNIT FOR WIND POWER GENERATION DEVICE

(71) Applicant: JTEKT CORPORATION, Osaka-shi, Osaka (JP)

(72) Inventor: Hideki Fujiwara, Kitakatsuragi-gun (JP)

(73) Assignee: JTEKT CORPORATION, Osaka (JP)

( * ) Notice: Subject to any disclaimer, the term of this patent is extended or adjusted under 35 U.S.C. 154(b) by 86 days.

(21) Appl. No.: 14/774,343

(22) PCT Filed: Mar. 4, 2014

(86) PCT No.: PCT/JP2014/055415
§ 371 (c)(1),
(2) Date: Sep. 10, 2015

(87) PCT Pub. No.: WO2014/141944
PCT Pub. Date: Sep. 18, 2014

(65) Prior Publication Data
US 2016/0017934 A1    Jan. 21, 2016

(30) Foreign Application Priority Data

Mar. 12, 2013   (JP) ................. 2013-048937

(51) Int. Cl.
*F16D 41/064* (2006.01)
*F16D 41/067* (2006.01)
(Continued)

(52) U.S. Cl.
CPC .......... *F16D 41/064* (2013.01); *F03D 15/00* (2016.05); *F16D 41/06* (2013.01); *F16D 41/067* (2013.01);
(Continued)

(58) Field of Classification Search
CPC ...... F16D 41/06; F16D 41/064; F16D 41/067; F16D 2250/0038; F16D 2300/10; F03D 15/00; F05B 2260/4023–2260/40311
See application file for complete search history.

(56) References Cited

U.S. PATENT DOCUMENTS 3,895,539 A * 7/1975 Weman .................. F16D 41/12
242/384
5,415,258 A * 5/1995 Numata .................. F16D 41/07
192/107 T
(Continued)

FOREIGN PATENT DOCUMENTS

CN    102032122 A    4/2011
EP    2113655 A1    11/2009
(Continued)

OTHER PUBLICATIONS

Jun. 10, 2014 International Search Report issued in International Patent Application No. PCT/JP2014/055415.
(Continued)

*Primary Examiner* — Jacob S Scott
(74) *Attorney, Agent, or Firm* — Oliff PLC

(57) ABSTRACT

A one-way clutch, disposed between an input rotating body and an output rotating body, is used to connect the input and output rotating bodies so that the rotating bodies are rotatable integrally in a state in which the rotation speed of the input rotating body is higher than that of the output rotating body and to cut off the connection between the input and output rotating bodies in a state in which the rotation speed of the input rotating body is lower than that of the output rotating body. A plurality of engaging elements or an inner ring and an outer ring constituting the one-way clutch are made of a base material obtained by subjecting a martensitic stainless steel material to soft nitriding treatment, and the
(Continued)

Vickers hardness of the portion up to 20 μm from the surface of the contact portion thereof is 1000 to 1500 Hv.

8 Claims, 10 Drawing Sheets

(51) Int. Cl.
*F03D 15/00* (2016.01)
*F16D 41/06* (2006.01)

(52) U.S. Cl.
CPC ........... *F05B 2260/4023* (2013.01); *F05B 2260/40311* (2013.01); *F16D 2250/0038* (2013.01); *F16D 2300/10* (2013.01); *Y02E 10/721* (2013.01)

(56) References Cited

U.S. PATENT DOCUMENTS

| | | | |
|---|---|---|---|
| 6,095,693 A | 8/2000 | Fujiwara | |
| 6,227,803 B1 | 5/2001 | Shim | |
| 6,856,042 B1 | 2/2005 | Kubota | |
| 9,035,476 B2* | 5/2015 | Fujiwara | F16D 7/10 290/1 C |
| 2004/0099498 A1* | 5/2004 | Kurita | B60N 2/1615 192/12 B |
| 2009/0278361 A1* | 11/2009 | Okubo | B60W 30/19 290/1 C |
| 2010/0294078 A1 | 11/2010 | Ono et al. | |
| 2011/0077120 A1 | 3/2011 | Dirk | |
| 2012/0045335 A1 | 2/2012 | Heidenreich et al. | |
| 2012/0201679 A1 | 8/2012 | Heidenreich et al. | |
| 2012/0243991 A1 | 9/2012 | Han | |
| 2013/0037370 A1* | 2/2013 | Marion | F16D 13/76 192/55.5 |
| 2014/0090945 A1* | 4/2014 | Fujiwara | F16D 41/064 192/45.001 |
| 2014/0094338 A1 | 4/2014 | Han | |
| 2016/0131197 A1* | 5/2016 | Hurry | B60K 25/02 192/75 |

FOREIGN PATENT DOCUMENTS

| | | |
|---|---|---|
| JP | H04-344198 A | 11/1992 |
| JP | H11-344052 A | 12/1999 |
| JP | 2006-183755 A | 7/2006 |
| JP | 2008-095898 A | 4/2008 |
| JP | 2011-085192 A | 4/2011 |

OTHER PUBLICATIONS

Nov. 22, 2016 Office Action issued in Japanese Patent Application No. 2013-048937.

Oct. 17, 2016 Search Report issued in European Patent Application No. 14763488.5.

Jul. 31, 2017 Office Action issued in Chinese Application No. 201480014432.6.

* cited by examiner

ONE-WAY CLUTCH AND ONE-WAY CLUTCH UNIT FOR WIND POWER GENERATION DEVICE

TECHNICAL FIELD

An embodiment of the present invention relates to a one-way clutch and a one-way clutch unit, for example, for a wind power generation device.

BACKGROUND ART

In a wind power generation device according to the background art of the present application, upon receiving wind power, blades rotate the main spindle connected thereto, and a speed-up gear increases the rotation of the main spindle, thereby driving a power generator.

However, in the above-mentioned wind power generation device, the rotation speed of the main spindle changes due to the change in wind speed or wind direction, whereby the wind power generation device has a disadvantage that the rotation torque of the main spindle to be input from the speed-up gear to the power generator changes and the power generation efficiency of the generation device lowers. Hence, in the wind power generation device, there is a need for a technology for suppressing the change in the rotation torque and improving the power generation efficiency.

Furthermore, the wind power generation device is installed on the assumption that the generation device is usually used for a long time, 10 or more years. Moreover, the wind power generation device is installed, for example, in mountainous or coastal areas or at sea due to noise caused by the rotation of the main spindle and the driving of the power generator, wind conditions, etc. In addition, since the main components of the wind power generation device are required to be installed at a high place, such as a wind power generation tower, and the components themselves are large and heavy, a great amount of labor is required for installing and removing the components at the time of maintenance. Hence, it is desired that maintenance is required as less as possible, and there is a need for a wind power generation device with a long life and high reliability.

On the other hand, in order that a synchronous power generator is operated in parallel in an operation state synchronized with a power generator in another system, it is proposed to provide a one-way clutch between the output shaft of the speed-up gear of the synchronous power generator and the drive shaft of the power generator (refer to Patent Document 1, for example).

RELATED ART DOCUMENTS

Patent Documents

Patent Document 1: JP-A-H04-344198

SUMMARY OF THE INVENTION

Problem to be Solved by the Invention

In the above-mentioned wind power generation device, smearing (a phenomenon in which seizure is caused on a surface layer) occurs on the rolling faces of the rolling elements, such as rollers, and the raceway faces of the rotation rings of the rolling bearings, such as roller bearings, for supporting the output shaft of the wind power generation device rotating at high speed, and this causes a situation in which the lives of the rolling bearings, such as roller bearings, are reduced.

Furthermore, in the one-way clutch, in the case that the fluctuation range of the rotation is small, for example, as in the case that a state in which the fluctuation of wind speed is small continues, oil film is hardly formed between the engaging face of each engaging element of the clutch and the raceway face of the inner ring thereof and between the engaging face and the raceway face of the outer ring thereof, and this causes a situation in which the engaging face of the engaging element and the raceway faces of the inner ring and the outer ring are liable to wear and have difficulty in maintaining sufficient hardness for use for a long time.

In consideration of the above-mentioned situations encountered in the above-mentioned technology, an aspect of the present invention is intended to provide a one-way clutch and a one-way clutch unit for a wind power generation device, capable of effectively suppressing smearing from occurring on the roller bearings for supporting the output shaft of the speed-up gear of the wind power generation device and also capable of maintaining sufficient hardness for use for a long time even after long-term abrasion.

Means for Solving the Problem

The inventors of the present invention have earnestly researched the mechanism of causing smearing. As a result, it is found that, when the rotation speed of the main spindle lowers abruptly due to the lowering of wind power, the rotation speed of the drive shaft of the power generator becomes higher than the rotation speed of the output shaft due to the inertia of the rotor of the power generator having a heavy mass, and the so-called torque omission (load omission) occurs; that the radial load exerted to the rolling bearings, such as roller bearings, for supporting the output shaft is reduced due to this torque omission; that, for example, the sliding frictional resistance between the rolling elements, such as rollers of the roller bearings, and the cage for holding them becomes higher than the rolling frictional resistance between the rolling elements (for example, rollers) of the roller bearings, such as roller bearings, and the rotation rings thereof; and that the rotation of the rolling elements themselves, such as rollers, is delayed. In addition, it is also found that, when the rotation speed of the main spindle is increased abruptly from the above-mentioned state by the increase of wind power, the inertia torque due to the increase in speed is added and the radial load exerted to the rolling bearings, such as roller bearings, for supporting the output shaft is increased, whereby, at the moment of the increase, the rollers slide on the contact faces between the rollers and the rotation rings in the state in which the high load is applied to the rollers, the temperature at the contact faces rises, and smearing occurs; on the basis of these findings, the inventors have completed the present invention.

More specifically, an aspect of the present invention provides a one-way clutch including: an inner ring provided on one rotating body out of an input rotating body provided so as to be integrally rotatable with the output shaft of a speed-up gear of a wind power generation device and an output rotating body provided so as to be integrally rotatable with a drive shaft of a power generator to which the rotation of the output shaft is transmitted and coaxially disposed radially inside or outside the input rotating body; an outer ring provided on the other rotating body and disposed radially outside the inner ring; and a plurality of engaging elements individually disposed in a plurality of spaces formed between both raceway faces of the inner ring and the outer ring, wherein, in a state in which a rotation speed of the input rotating body is higher than a rotation speed of the output rotating body, the engaging elements engage with both the raceway faces of the inner ring and the outer ring to connect the input rotating body to the output rotating body so that the rotors are integrally rotatable, and in a state in which the rotation speed of the input rotating body is lower than the rotation speed of the output rotating body, the engaging elements release the engagement to cut off connection between the input rotating body and the output rotating body, and wherein the plurality of engaging elements or the inner ring and the outer ring are made of a base material obtained by subjecting a martensitic stainless steel material to soft nitriding treatment, and Vickers hardness of a portion up to 20 μm from a surface of a contact portion where the base material contacts a mating member due to the sliding or engagement between the base material and the mating member is 1000 to 1500 Hv.

Furthermore, another aspect of the present invention provides a one-way clutch unit including: the above-mentioned one-way clutch; and a rolling bearing which is provided adjacent to the one-way clutch and between the input rotating body provided so as to be integrally rotatable with the output shaft of the speed-up gear of the wind power generation device and the output rotating body provided so as to be integrally rotatable with the drive shaft of the power generator to which the rotation of the output shaft is transmitted and coaxially disposed radially inside or outside the input rotating body, and which supports the input rotating body and the output rotating body so that the rotating bodies are rotatable relatively to each other.

With the one-way clutch and the one-way clutch unit in which the above-mentioned configuration is adopted, in a state in which the rotation speed of the input rotating body is higher than the rotation speed of the output rotating body, the engaging elements engage with both the raceway faces of the inner ring and the outer ring to connect the input rotating body to the output rotating body so that the rotating bodies are integrally rotatable, and in a state in which the rotation speed of the input rotating body is lower than the rotation speed of the output rotating body, the engaging elements release the engagement to cut off the connection between the input rotating body and the output rotating body; hence, even if the rotation speed of the output shaft is lowered abruptly via the main spindle due to the lowering of an external force, the inertia rotation of the rotor of the power generator can be prevented from being transmitted to the output shaft via the drive shaft, whereby the decrease in the radial load exerted to the rolling bearings for supporting the output shaft and the delay in the rotation of the rolling elements themselves accompanied by the decrease can be suppressed. Hence, with the one-way clutch in which the above-mentioned configuration is adopted, when the rotation speed of the main spindle is increased abruptly due to the change in the external force and a high load is applied to the rolling elements from the above-mentioned state, the rolling elements hardly slide on the contact faces making contact with the rotation rings, whereby the occurrence of smearing on the rolling bearings for supporting the output shaft of the speed-up gear of the wind power generation device can be suppressed effectively.

Furthermore, with the one-way clutch and the one-way clutch unit in which the above-mentioned configuration is adopted, since the base material obtained by subjecting the martensitic stainless steel material to soft nitriding treatment is used, and the Vickers hardness of the portion up to 20 μm from the surface of the contact portion is 1000 to 1500 Hv, the engaging faces of the plurality of respective engaging elements or the raceway faces of the inner ring and the outer ring can be maintained so as to have sufficient surface hardness for use in the wind power generation device even after long-term abrasion.

In the one-way clutch and the one-way clutch unit for the wind power generation device described above, an internal hardness of the contact portion is preferably 54 HRC or more. In this case, since the internal hardness of the contact portion is sufficient for use in the wind power generation device, sufficient fatigue resistance strength can be secured.

Moreover, in the one-way clutch and the one-way clutch unit described above, Vickers hardness of the portion up to 20 μm from the surface of the contact portion is preferably 1150 to 1500 Hv. In this case, sufficient hardness can be secured even if the estimated abrasion amount thereof for 10 years is taken into consideration, and the engaging faces of the plurality of respective engaging elements or the raceway faces of the inner ring and the outer ring can be maintained so as to have higher surface hardness even after long-term abrasion.

Still further, in the one-way clutch and the one-way clutch unit described above, it is preferable that: the engaging elements are cylindrical rollers or sprags, and a clearance is provided between the tip end portion of the input rotating body in an axial direction and an opposing face of the drive shaft opposing the tip end portion of the input rotating body in the axial direction and another clearance is provided between the tip end portion of the output rotating body in the axial direction and an opposing face of the input rotating body opposing to the tip end portion of the output rotating body in the axial direction, whereby the inner ring and the outer ring are allowed to move relatively in the axial direction; and the Vickers hardness of a portion up to 20 μm from a surface of a portion with which the engaging element relatively slides or engages when the input rotating body or the output rotating body expands or contracts in the axial direction due to temperature change is 1000 to 1500 Hv. At this time, in the above-mentioned one-way clutch, the rolling bearings are rolling bearings. In this case, even if a dislocation occurs at the portion with which the engaging element relatively slides or engages due to temperature change, the engaging faces of the plurality of respective engaging elements or the raceway faces of the inner ring and the outer ring can be maintained so as to have sufficient surface hardness for use in the wind power generation device even after long-term abrasion.

Advantages of the Invention

With the one-way clutch and the one-way clutch unit for the wind power generation device according to the present invention, smearing can be suppressed from occurring on the roller bearings for supporting the output shaft of the speed-up gear of the wind power generation device, and sufficient hardness for use can be maintained for a long time even after long-term abrasion.

MODE FOR CARRYING OUT THE INVENTION (Configuration of Wind Power Generation Device)

An embodiment according to the present invention will be described below referring to the accompanying drawings.

Figure 1:
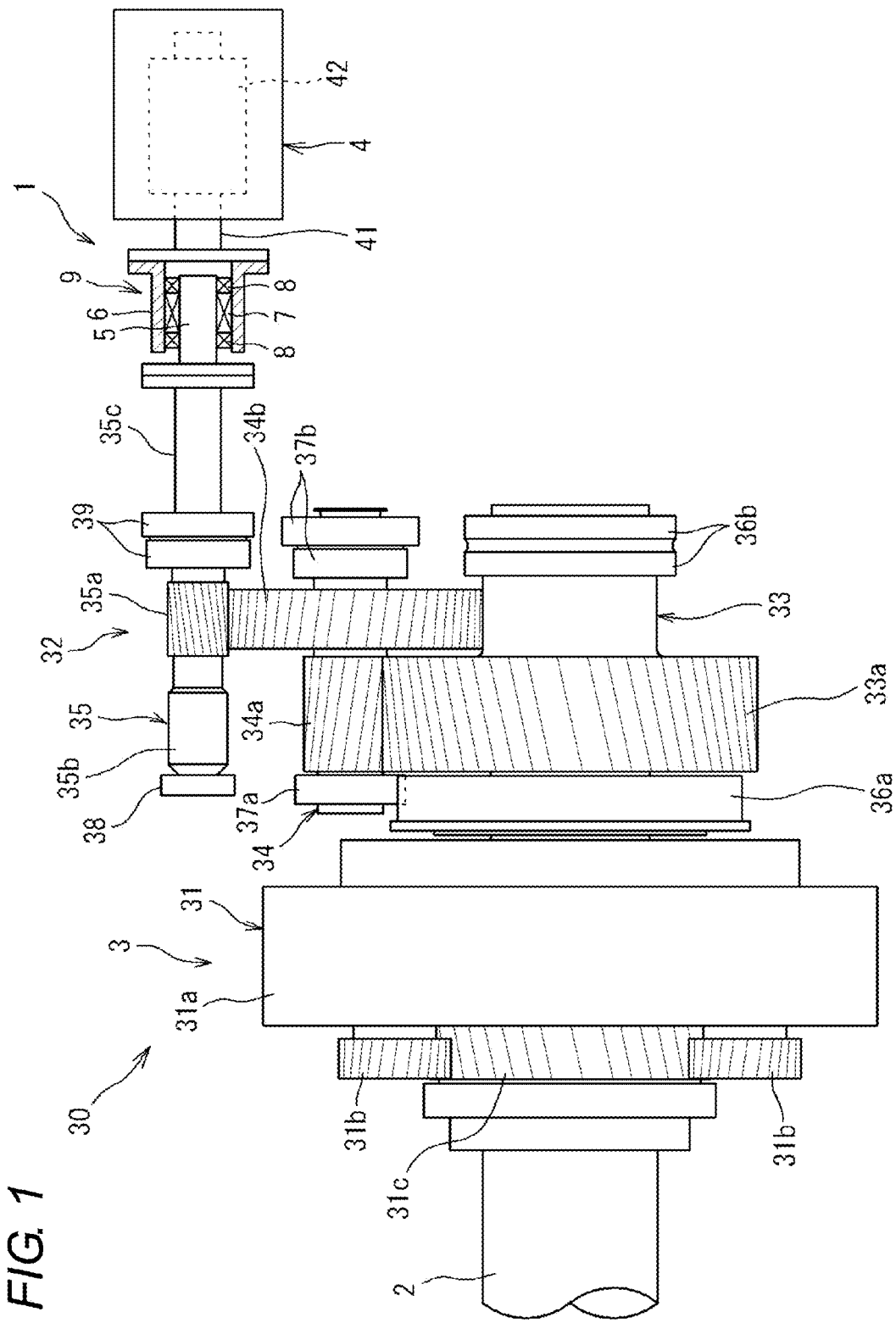
FIG. 1 is a schematic side view showing a wind power generation device incorporating a one-way clutch according to an embodiment of the present invention.

FIG. 1 is a schematic side view showing a wind power generation device incorporating a one-way clutch according to an embodiment of the present invention. This wind power generation device 1 is equipped with a main spindle 2 that is rotated by receiving wind power, a speed-up gear 3 connected to this main spindle 2, a power generator 4 connected to this speed-up gear 3, an input rotating body 5 provided on the output shaft 35 of the speed-up gear 3 so as to be integrally rotatable therewith, an output rotating body 6 provided on the drive shaft 41 of the power generator 4 so as to be integrally rotatable therewith, a one-way clutch 7 disposed between the input rotating body 5 and the output rotating body 6, and a pair of rolling bearings 8 disposed on both the sides of the one-way clutch 7 in the axial direction. In this wind power generation device 1, the rotation of the main spindle 2 rotated by wind power is increased by the speed-up gear 3 and transmitted to the power generator 4, and the power generator 4 is driven to generate electricity.

To the tip end portion of the main spindle 2, blades (not shown) serving as wind-receiving members, for example, are connected to the tip end portion of the main spindle 2 so as to be integrally rotatable therewith. The blades are designed to rotate together with the main spindle 2 upon receiving wind power.

The power generator 4 has the drive shaft 41 that is rotated when the rotation increased by the speed-up gear 3 is input thereto, a rotor 42 incorporated in the power generator 4, a stator, not shown, etc. The rotor 42 is connected to the drive shaft 41 so as to be integrally rotatable therewith, and the drive shaft 41 rotates to drive the rotor 42, thereby generating electricity.

The speed-up gear 3 is equipped with a gear mechanism (rotation transmission mechanism) 30 to which the rotation of the main spindle 2 is input and in which the rotation is increased. This gear mechanism 30 is equipped with a planetary gear mechanism 31 and a high speed stage gear mechanism 32 to which the rotation increased by the planetary gear mechanism 31 is input and in which the rotation is further increased.

The planetary gear mechanism 31 has an internal gear 31a, a plurality of planetary gears 31b being held by a planetary carrier (not shown) that is connected to the main spindle 2 so as to be integrally rotatable therewith, and a sun gear 31c engaged with the planetary gears 31b. With this configuration, when the planetary carrier is rotated together with the main spindle 2, the sun gear 31c is rotated via the planetary gears 31b, and the rotation is transmitted to the low-speed shaft 33 of the high speed stage gear mechanism 32.

The high speed stage gear mechanism 32 is equipped with the low-speed shaft 33 having a low-speed gear 33a, an intermediate shaft 34 having a first intermediate gear 34a and a second intermediate gear 34b, and the output shaft 35 having a high-speed gear 35a.

The low-speed shaft 33 is formed of a large rotation shaft and disposed coaxially with the main spindle 2. Both the end portions of the low-speed shaft 33 in the axial direction are rotatably supported by roller bearings 36a and 36b.

The intermediate shaft 34 is disposed above the low-speed shaft 33. Furthermore, both the end portions of the intermediate shaft 34 in the axial direction are rotatably supported by roller bearings 37a and 37b. The first intermediate gear 34a of the intermediate shaft 34 is engaged with the low-speed gear 33a, and the second intermediate gear 34b is engaged with the high-speed gear 35a.

The output shaft 35 is disposed above the intermediate shaft 34 and designed to output rotational torque. The one end portion 35b and the other end portion (output end portion) 35c of the output shaft 35 in the axial direction are rotatably supported by roller bearings 38 and 39, respectively.

With the above-mentioned configuration, the rotation of the main spindle 2 is increased in three steps according to the gear ratio of the planetary gear mechanism 31, the gear ratio between the low-speed gear 33a and the first intermediate gear 34a, and the gear ratio between the second intermediate gear 34b and the high-speed gear 35a, and the rotation is used to drive the power generator 4.

Figure 2:
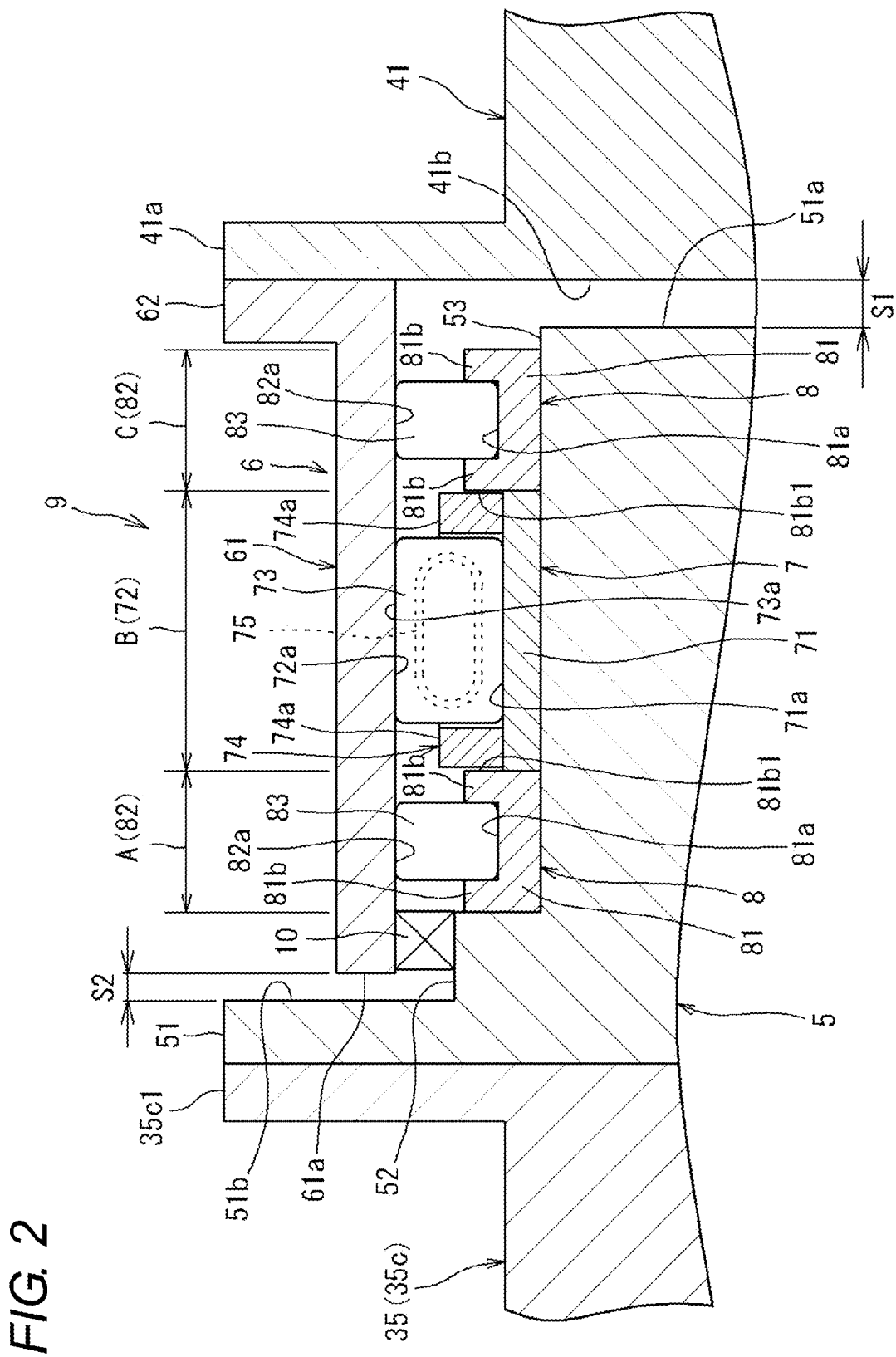
FIG. 2 is a cross-sectional view showing the connection portion between the output shaft of the speed-up gear and the drive shaft of the power generator in the wind power generation device shown in FIG. 1.

FIG. 2 is a cross-sectional view showing the connection portion (one-way clutch unit) between the output shaft 35 of the speed-up gear 3 and the drive shaft 41 of the power generator 4.

The one-way clutch unit 9 shown in FIG. 2 is equipped with the input rotating body 5, the output rotating body 6, the one-way clutch 7, and the pair of rolling bearings 8. The one-way clutch 7 and the rolling bearings 8 are designed to transmit the rotation of the output shaft 35 to the drive shaft 41 via the input rotating body 5 and the output rotating body 6. Although the one-way clutch unit 9 shown in FIG. 2 has the rolling bearings 8 disposed on both the sides of the one-way clutch 7 in the axial direction, it is possible to use a one-way clutch unit having the rolling bearing 8 disposed only on one side of the one-way clutch 7 in the axial direction.

The input rotating body 5 is disposed coaxially with the output shaft 35 and has a flange portion 51, a large-diameter portion 52 and a small-diameter portion 53 in this order in the direction from one end portion (the left end portion in FIG. 2) to the other end portion (the right end portion in FIG. 2) thereof in the axial direction.

The flange portion 51 is formed so as to extend radially outward from the outer peripheral face of the large-diameter portion 52 and is detachably fixed to the output end portion 35c of the output shaft 35. More specifically, while making contact with the flange portion 35c1 formed at the output end portion 35c, the flange portion 51 is secured and fixed to the flange portion 35c1 using bolts and nuts, not shown.

The output rotating body 6 is disposed on the outside of the input rotating body 5 in the radial direction so as to be coaxial therewith and has a cylindrical portion 61 and a flange portion 62 formed on the other end portion (the right end portion in FIG. 3) of the cylindrical portion 61 in the axial direction.

The flange portion 62 is formed so as to extend radially outward from the outer peripheral face of the cylindrical portion 61 and is detachably fixed to one end portion of the drive shaft 41. More specifically, while making contact with the flange portion 41a formed on the one end portion of the drive shaft 41, the flange portion 62 is secured and fixed to the flange portion 41a using bolts and nuts, not shown.

The inner peripheral face of the cylindrical portion 61 is a cylindrical face, and a ring-shaped sealing member 10 for hermetically sealing the ring-shaped space between the cylindrical portion 61 and the small-diameter portion 53 of the input rotating body 5 is provided in the clearance between the inner peripheral face of one end portion of the cylindrical portion 61 in the axial direction (the left end portion in FIG. 3) and the outer peripheral face of the large-diameter portion 52 of the input rotating body 5.

The one-way clutch 7 is disposed between the input rotating body 5 and the output rotating body 6. The one-way clutch 7 is provided to transmit the rotation of the output shaft 35 to the drive shaft 41 via the input rotating body 5 and the output rotating body 6 so as to be connectable thereto and disconnectable therefrom.

The respective rolling bearings 8 used as a pair are disposed between the small-diameter portion 53 of the input rotating body 5 and the cylindrical portion 61 of the output rotating body 6 and support the output shaft 35 and the drive shaft 41 so that the output shaft 35 and the drive shaft 41 are rotatable relatively to each other via the input rotating body 5 and the output rotating body 6. Furthermore, the rolling bearings 8 are respectively disposed adjacent to both the sides of the one-way clutch 7 in the axial direction so that the end portions of the bearings in the axial direction can respectively make contact with both the end faces of the cage 74 of the one-way clutch 7 in the axial direction.

The rolling bearing 8 is a cylindrical roller bearing equipped with an inner ring 81, an outer ring 82, and a plurality of cylindrical rollers 83 rotatably disposed between the inner ring 81 and the outer ring 82.

The inner ring 81 has an inner ring raceway face 81a formed on the outer periphery thereof and inner ring rib portions 81b formed so as to protrude outward in the radial direction on both the sides of the inner ring raceway face 81a in the axial direction. Both the end faces of the cylindrical roller 83 respectively make slide contact with the inside faces of the inner ring rib portions 81b. Moreover, the outside face 81b1 of the inner ring rib portion 81b adjacent to the one-way clutch 7 is used as a contact face with which the outside face of the ring-shaped portion 74a of the cage 74 serving as the end face of the cage 74 of the one-way clutch 7 in the axial direction makes contact.

The region A and the region C at both the end portions of the cylindrical portion 61 of the output rotating body 6 in the axial direction are used as the outer rings 82 of the rolling bearings 8, and the outer ring raceway face 82a of the outer ring 82 is formed on the inner peripheral face of each of the regions A and C. The cylindrical rollers 83 are rotatably disposed between the outer ring raceway face 82a and the inner ring raceway face 81a.

In the present invention, the input rotating body and the output rotating body may be formed so as to be integrated with the output shaft and the drive shaft, respectively. Furthermore, the output rotating body may be disposed on the inside of the input rotating body in the radial direction. In this case, the inner peripheral face of the outer ring of the one-way clutch may merely be formed as a cam face, and the outer peripheral face of the inner ring thereof may merely be formed as a cylindrical face. Furthermore, in this case, the outer peripheral face of the inner ring may be formed on the outer peripheral face of the output rotating body, and the output rotating body may also be used as the inner ring.

Moreover, the outer rings of the one-way clutch and the rolling bearings may be provided as members separated from the output rotating body.

What's more, although the cylindrical roller bearings are used as the rolling bearings to be disposed between the input rotating body and the output rotating body to allow the output rotating body to move in the axial direction, ball bearings may also be used in the case that the output rotating body is not allowed to move in the axial direction.

Furthermore, the outer rings of the rolling bearings may be provided as members separated from the output rotating body, and the cage of the one-way clutch may be made contact with the outer rings.

(Configuration of One-Way Clutch)

Figure 3:
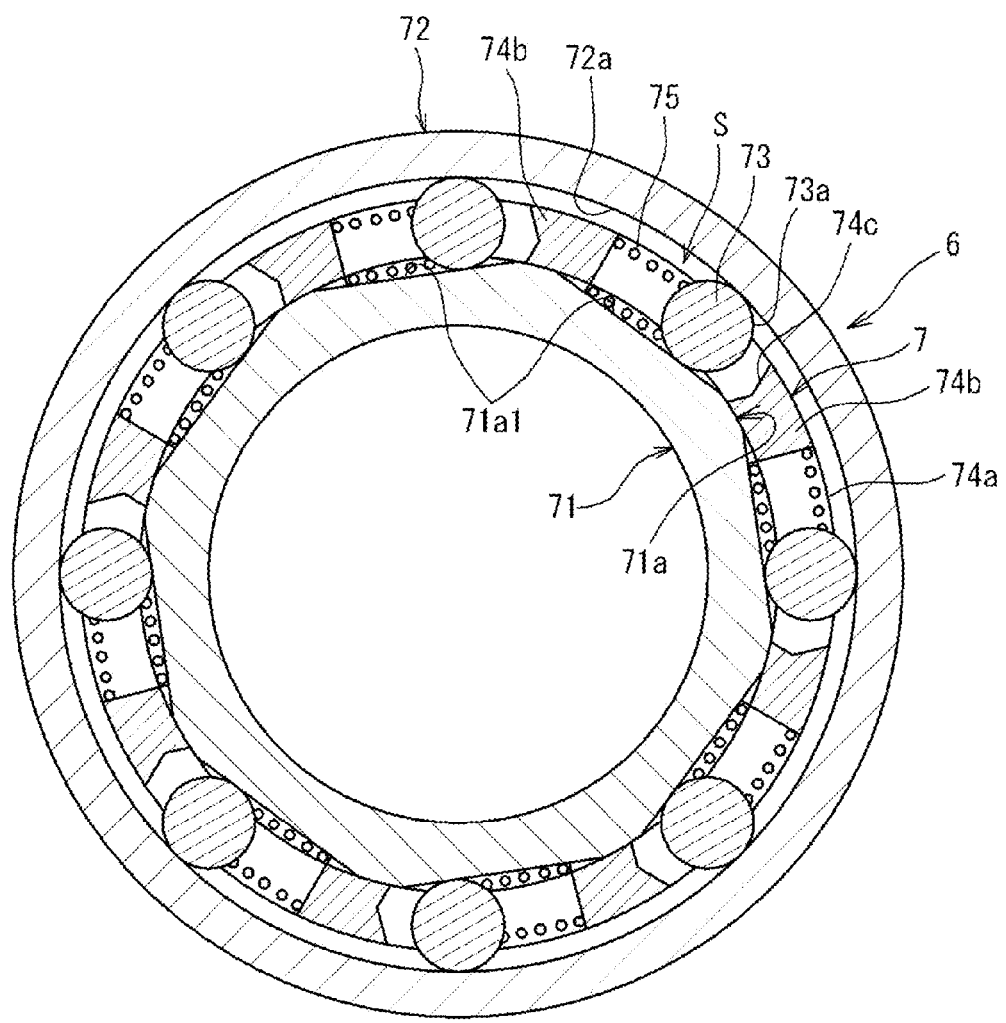
FIG. 3 is a cross-sectional view showing the one-way clutch according to the embodiment of the present invention.

FIG. 3 is a cross-sectional view showing the one-way clutch 7. As shown in FIGS. 2 and 3, the one-way clutch 7 is equipped with an inner ring 71, an outer ring 72, and a plurality of cylindrical rollers 73 serving as engaging elements disposed between the outer peripheral face 71a of the inner ring 71 and the inner peripheral face 72a of the outer ring 72.

The outer peripheral face 71a of the inner ring 71 and the inner peripheral face 72a of the outer ring 72 may sometimes be collectively referred to as "the raceway faces 71a and 72a of the inner and outer rings 71 and 72" in the following descriptions.

The inner ring 71 is fitted on the central portion of the small-diameter portion 53 of the input rotating body 5 in the axial direction so as to integrally rotate with the small-diameter portion 53. The region B at the central portion of the cylindrical portion 61 of the output rotating body 6 in the axial direction is used as the outer ring 72 of the one-way clutch 7. Hence, the inner peripheral face 72a is formed on the inner peripheral face of the region B of the cylindrical portion 61. The cylindrical rollers 73 have a cylindrical shape, and the cylindrical rollers, eight in number, are disposed in the radial direction in this embodiment.

The one-way clutch 7 is further equipped with the ring-shaped cage 74 for retaining the respective cylindrical rollers 73 at predetermined intervals in the circumferential direction and a plurality of elastic members 75 for elastically energizing the cylindrical rollers 73 in one direction.

The cage 74 has a pair of ring-shaped portions 74a opposed to each other in the axial direction and a plurality of pillar portions 74b extending in the axial direction between both the ring-shaped portions 74a and arranged at equal intervals in the circumferential direction so as to connect both the ring-shaped portion 74a. Each of a plurality of pockets 74c is formed between both the ring-shaped portions 74a and the pillar portions 74b adjacent to each other, whereby each cylindrical roller 73 is accommodated in each pockets 74c.

The elastic member 75, formed of a compression coil spring, is accommodated in each pocket 74c of the cage 74 and attached to the pillar portion 74b.

Flat cam faces 71a1 as many (eight) as the cylindrical rollers 73 are formed on the outer peripheral face 71a of the inner ring 71. Furthermore, the inner peripheral face 72a of the outer ring 72 is formed as a cylindrical face. A plurality (eight) of spaces (wedge-shaped spaces) S are formed in the circumferential direction between the cam faces 71a1 of the inner ring 71 and the cylindrical face of the outer ring 72. Moreover, the cylindrical roller 73 is disposed in each wedge-shaped spaces S, and the elastic member 75 energizes the cylindrical roller 73 in the direction of making the wedge-shaped space S narrower. The outer peripheral face of the cylindrical roller 73 serves as a contact face 73a making contact with the cam face 71a1 of the inner ring 71 and the cylindrical face of the outer ring 72, and this contact face 73a is formed straight in the width direction (in the axial direction). Grease, a lubricant containing an ester compound as base oil, containing a urea compound as a thickener and hardly affected by temperature change, is supplied between the inner ring 71 and the outer ring 72.

In the one-way clutch 7 configured as described above, in the case that the rotation speed of the input rotating body 5 becomes higher than the rotation speed of the output rotating body 6 when the rotation of the input rotating body 5 is increased, the inner ring 71 tends to rotate relatively with respect to the outer ring 72 in one direction (the counterclockwise direction in FIG. 3). In this case, the cylindrical roller 73 is moved slightly in the direction of narrowing the wedge-shaped space S by the energizing force of the elastic member 75. Then, the contact face 73a of the cylindrical roller 73 makes pressure contact with the outer peripheral face 71a of the inner ring 71 and the inner peripheral face 72a of the outer ring 72, whereby the cylindrical rollers 73 are engaged between the inner ring 71 and the outer ring 72 in the one-way clutch 7. As a result, the inner ring 71 and the outer ring 72 can rotate integrally in the one direction, whereby the input rotating body 5 and the output rotating body 6 can be connected to each other so as to be rotatable integrally.

Furthermore, after the rotation of the input rotating body 5 is increased and when the rotation speed thereof becomes constant and equal to the rotation speed of the output rotating body 6, the cylindrical rollers 73 are held in a state of being engaged between the inner ring 71 and the outer ring 72. Hence, the one-way clutch 7 maintains the integrated rotation of the inner ring 71 and the outer ring 72 in the one direction, and the input rotating body 5 and the output rotating body 6 continue to rotate integrally.

On the other hand, in the case that the rotation speed of the input rotating body 5 becomes lower than the rotation speed of the output rotating body 6 when the rotation of the input rotating body 5 is decreased, the inner ring 71 tends to rotate relatively with respect to the outer ring 72 in the other direction (the clockwise direction in FIG. 3). In this case, the cylindrical roller 73 is moved slightly in the direction of widening the wedge-shaped space S against the energizing force of the elastic member 75, whereby the engagement between the cylindrical rollers 73 and the inner ring 71 and the engagement between the cylindrical rollers 73 and the outer ring 72 are released. Since the engagement of the cylindrical rollers 73 is released in this way, the connection between the input rotating body 5 and the output rotating body 6 is cut off.

As described above, in the state in which the rotation speed of the input rotating body 5 is higher than the rotation speed of the output rotating body 6, the one-way clutch 7 according to this embodiment connects the input rotating body 5 to the output rotating body 6 so as to be rotatable integrally, and in the state in which the rotation speed of the input rotating body 5 is lower than the rotation speed of the output rotating body 6, the one-way clutch 7 cuts off the connection between the input rotating body 5 and the output rotating body 6, whereby even if the rotation speed of the output shaft 35 is lowered abruptly via the main spindle 2 due to the lowering of wind power, the inertia rotation of the rotor 42 of the power generator 4 can be prevented from being transmitted to the output shaft 35 via the drive shaft 41, whereby the decrease in the radial load exerted to the rolling bearings 38 and 39 for supporting the output shaft 35 and the delay in the rotation of the rollers themselves accompanied by the decrease can be suppressed. Hence, in the one-way clutch 7 according to this embodiment, when the rotation speed of the main spindle 2 is increased abruptly due to the change in wind power and a high load is applied to the rollers from the above-mentioned state, the sliding of the rollers on the contact faces making contact with the rotation rings becomes difficult, whereby the occurrence of smearing on the roller bearings can be suppressed effectively.

In the wind power generation device 1, since the members constituting the wind power generation device 1 are generally large, the expansion/contraction amounts thereof due to temperature change become large.

Unlike the case of a ball bearing, the one-way clutch 7 according to this embodiment is not constrained in the axial direction. In other words, as shown in FIG. 2, in the one-way clutch 7 according to this embodiment, a clearance S1 is provided between the tip end portion 51a of the input rotating body 5 in the axial direction and the face 41b of the drive shaft 41 opposed to the tip end portion 51a of the input rotating body 5 in the axial direction. In addition, a clearance S2 is provided between the tip end portion 61a of the output rotating body 6 in the axial direction and the face 51b of the input rotating body 5 opposed to the tip end portion 61a of the output rotating body 6 in the axial direction. Since the clearances S1 and S2 are provided in the axial direction in the one-way clutch 7 according to this embodiment, the inner ring 71 and the outer ring 72 are allowed to move relatively in the axial direction.

Hence, in the case that the output shaft 35 and the drive shaft 41, for example, expand or contract in the axial direction due to temperature change and the distance between the two shafts is changed, the positions of the portions relatively sliding or engaging with the engaging elements (cylindrical rollers 73) are different from the positions of the raceway faces in the case of use under normal temperature. Therefore, not only the positions of the raceway faces in the case of use under normal temperature but also the portions relatively sliding or engaging with the engaging elements (cylindrical rollers 73) at the time when the input rotating body 5 or the output rotating body 6 expands or contracts in the axial direction due to temperature change within the range including an assumed positional dislocation amount are desired to be subjected to heat treatment so that the Vickers hardness of the portions up to 20 μm from the surfaces of the above-mentioned portions is 1000 to 1500 Hv and so that the internal hardness of the above-mentioned portions is 54 HRC or more. The positional dislocation amount can be estimated by assuming a temperature change range (for example, −40 to 60° C.) on the basis of the environmental temperature at which the wind power generation device 1 is used, the heating value of the power generator during use, etc. and by obtaining the expansion/contraction amounts of the respective members in the temperature change range through experiments or calculations.

In this embodiment, the cylindrical rollers 73, the inner ring 71 and the outer ring 72 of the one-way clutch 7 are made of a base material obtained from a martensitic stainless steel material. Although SUS440, SAE51440 and AIS440, etc. are taken as the examples of martensitic stainless steel materials, the present invention is not limited to only these examples. Of the above-mentioned martensitic stainless steel materials, SUS440 is preferable and SUS440C is further preferable in view of securing the hardness of the raceway faces of the one-way clutch.

The cylindrical rollers 73, the inner ring 71 and the outer ring 72 are made of a base material obtained by subjecting a martensitic stainless steel material to soft nitriding treatment. The engaging face 73a of the cylindrical roller 73 is a contact portion that relatively slides or engages between the cylindrical roller and the inner ring 71 and between the cylindrical roller and the outer ring 72. Furthermore, the raceway faces 71a and 72a of the inner and outer rings 71 and 72 are contact portions that relatively slide or engage between the respective rings and the cylindrical roller 73.

In this embodiment, although all the cylindrical roller 73, the inner ring 71 and the outer ring 72 of the one-way clutch 7 are made of the base material obtained from the martensitic stainless steel material, at least one of the cylindrical roller 73, the inner ring 71 and the outer ring 72 may be made of the base material obtained from the martensitic stainless steel material in the present invention. In view of securing sufficient hardness, at least the inner ring 71 may merely be made of the base material obtained from the martensitic stainless steel material, and all of the cylindrical roller 73, the inner ring 71 and the outer ring 72 may be made of the base material obtained from the martensitic stainless steel material.

Moreover, in the engaging face 73a of the cylindrical roller 73 serving as a contact portion that relatively slides or engages between the inner ring 71 and the outer ring 72 and in the inner ring 71 and the outer ring 72, the hardness (Vickers hardness) values of the portions up to 20 μm from the surfaces of the raceway faces 71a and 72a serving as contact portions that relatively slide or engage between the respective rings and the cylindrical roller 73 are 1000 Hv or more. The hardness values are preferably 1000 to 1500 Hv or less in view of securing sufficient hardness for use in the wind power generation device. The hardness (Vickers hardness) values are obtained by making measurements according to JIS Z 2244 in positions at a predetermined depth from the contact portions in the cross-sectional structures of the cylindrical roller 73, the inner ring 71 and the outer ring 72.

All the surface hardness values of the engaging face 73a and the raceway faces 71a and 72a are required to be 1000 Hv or more in this embodiment; however, of the surface hardness values of the cylindrical roller 73, the inner ring 71 and the outer ring 72, only the surface hardness values of the contact portions of the members made of the base material obtained from the martensitic stainless steel material may be 1000 Hv or more in the present invention. In view of improving abrasion resistance, the hardness (Vickers hardness) value of the portion up to 20 μm from the surface of at least the raceway face 71a of the inner ring 71 may merely be 1000 Hv or more, and the surface hardness values of all the engaging face 73a of the cylindrical roller 73 and the raceway faces 71a and 72a of the inner and outer rings 71 and 72 may be 1000 Hv or more.

Furthermore, in the engaging face 73a of the cylindrical roller 73 serves as the contact portion that relatively slides or engages between the cylindrical roller and the inner ring 71 and between the cylindrical roller and the outer ring 72 and in the inner ring 71 and the outer ring 72, the internal hardness (Rockwell (C scale) hardness) values at the raceway faces 71a and 72a serving as the contact portions that relatively slide or engage between the respective raceway faces and the cylindrical roller 73 are 54 HRC or more in view of securing sufficient hardness even after long-term abrasion. The upper limit of the internal hardness is usually not more than the surface hardness. The internal hardness values are obtained by making measurements according to JIS Z 2245 in positions at a predetermined depth from the contact portions in the cross-sectional structures of the cylindrical roller 73, the inner ring 71 and the outer ring 72.

The internal hardness values of the engaging face 73a and the raceway faces 71a and 72a are required to be 54 HRC or more in this embodiment; however, of the internal hardness values of the cylindrical roller 73, the inner ring 71 and the outer ring 72, only the internal hardness values of the contact portions of the members made of the above-mentioned base material may be 54 HRC or more in the present invention. In view of securing sufficient hardness even after long-term abrasion, the internal hardness value of at least the raceway face 71a of the inner ring 71 may merely be 54 HRC or more, and the internal hardness values of all the engaging face 73a of the cylindrical roller 73 and the raceway faces 71a and 72a of the inner and outer rings 71 and 72 may be 54 HRC or more.

Although the cylindrical rollers are used as the engaging elements in this embodiment, sprags may also be used as the engaging elements in the present invention.

The cylindrical rollers 73, the inner ring 71 and the outer ring 72 for use in the one-way clutch 7 according to this embodiment can be obtained, for example, by using the martensitic stainless steel material and by carrying out a method including the respective processes shown in FIGS. 4(a) to 4(i). Although a method for producing the engaging elements (cylindrical rollers 73) for use in the one-way clutch according to the embodiment of the present invention is taken as an example and described below, the present invention is not limited to only this example.

FIGS. 4(a) to 4(i) are process charts showing an example of the method for producing the engaging elements (cylindrical rollers 73) for use in the one-way clutch according to the embodiment of the present invention.

Figure 4:
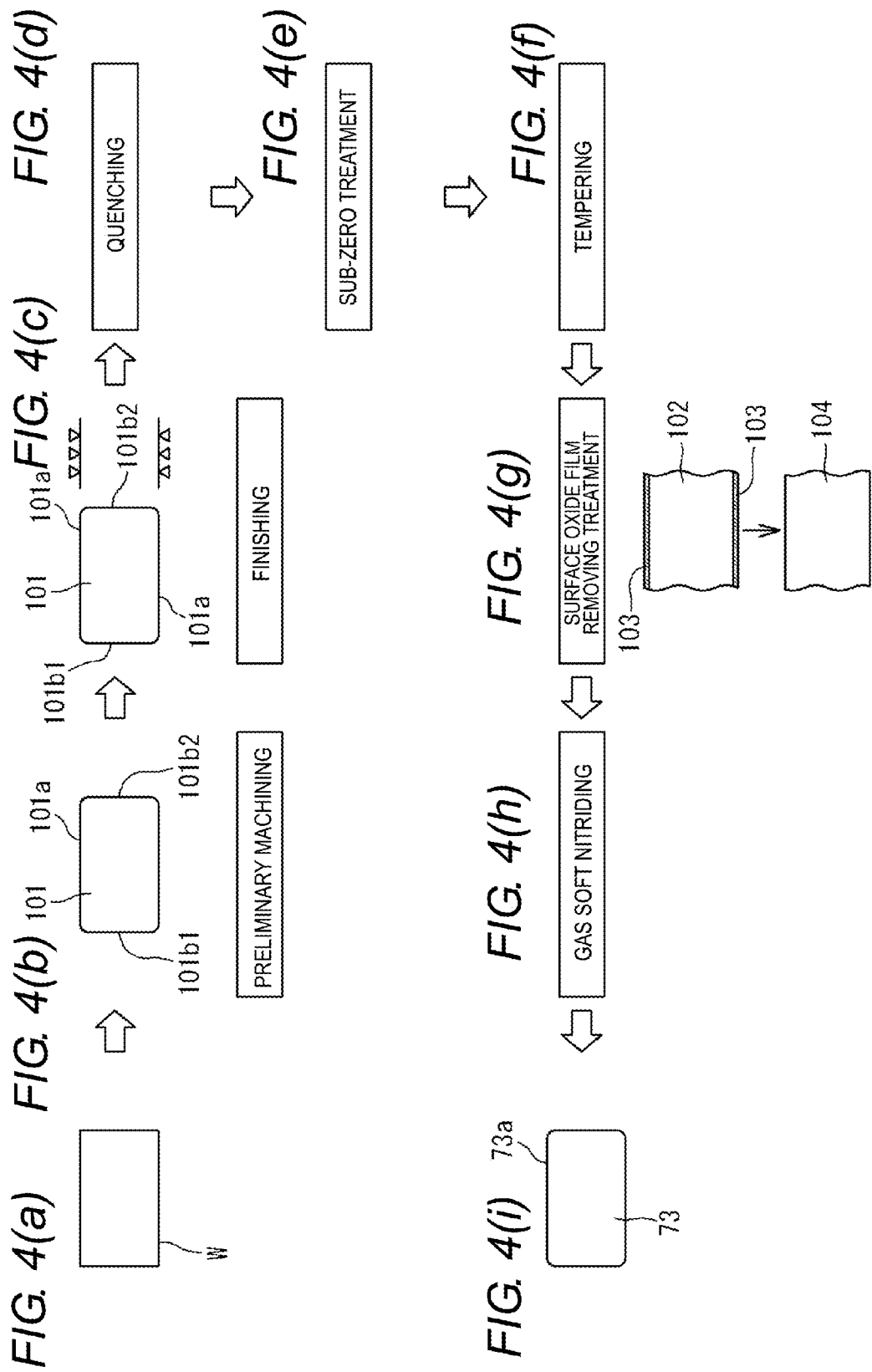
FIGS. 4(a) to 4(i) are process charts showing an example of the method for producing the engaging elements (cylindrical rollers 73) for use in the one-way clutch according to the embodiment of the present invention.

First, a cylindrical work piece W (see FIG. 4(a)) made of martensitic stainless steel is produced from the martensitic stainless steel material, and the obtained work piece W is subjected to a cutting process and the like so as to be formed into a predetermined shape to obtain the rough shape material 101 of a roller having a grinding allowance at portions where an outer peripheral face 101a and end faces 101b1 and 101b2 are respectively formed ("preliminary machining process", see FIG. 4(b)).

Next, the portions where the outer peripheral face 101a and the end faces 101b1 and 101b2 of the rough shape material 101 are respectively formed are subjected to a grinding process, and the portion where the outer peripheral face 101a is formed is further subjected to a super-finishing process so that the outer peripheral face has a predetermined accuracy ("finishing process", see FIG. 4(c)).

Then, the intermediate material obtained in the finishing process is subjected to quenching treatment ("quenching process", see FIG. 4(d)). This quenching treatment is carried out, for example, by heating the intermediate material at 1000 to 1100° C. for 5 or more minutes and then by rapidly cooling the intermediate material.

The rapid cooling is carried out by oil cooling using cooling oil in an oil bath.

Next, the intermediate material after the quenching treatment is subjected to sub-zero treatment ("sub-zero treatment process, see FIG. 4(e)). This sub-zero treatment is carried out, for example, by heating the intermediate material at −80 to −60° C. for 5 or more minutes.

Next, the intermediate material after the sub-zero treatment is subjected to tempering treatment ("tempering treatment", see FIG. 4(f)). This tempering treatment is carried out, for example, by heating the intermediate material at a temperature exceeding 400° C., usually 450 to 550° C.

Next, the oxide film 103 that is produced on the surface of the portion where the outer peripheral face 101a of the intermediate material 102 after the tempering treatment is formed is removed ("surface oxide film removing treatment", see FIG. 4(g)).

In the case of the martensitic stainless steel material, an oxide film is formed on the surface of the steel material by carrying out heat treatment or the like; hence, if the oxide film is not removed, it is difficult to form a layer made of a nitride on the surface of the steel material by carrying out nitriding treatment. Hence, the intermediate material 102 after the tempering treatment is subjected to the surface oxide film removing treatment as described above, whereby gas soft nitriding treatment after the film removing treatment can be carried out efficiently.

The oxide film 103 can be removed from the surface of the intermediate material 102, for example, by leaving the intermediate material 102 in a reducing-gas atmosphere. Although nitrogen fluoride is taken as an example of a reducing gas, the present invention is not limited to only this example.

Next, the intermediate material 104 obtained after the surface oxide film removing treatment is subjected to gas soft nitriding treatment ("gas soft nitriding process", see FIG. 4(h)).

As a result, the cylindrical roller 73 serving as the engaging element of the one-way clutch 7 according to this embodiment is obtained (see FIG. 4(i). The engaging element is made of a base material obtained by subjecting the martensitic stainless steel to soft nitriding treatment. Furthermore, the Vickers hardness of the portion up to 20 μm from the surface of the contact portion of the engaging element is 1000 to 1500 Hv, and the internal hardness of the contact portion is 54 HRC or more.

The gas soft nitriding treatment is carried out, for example, by heating the intermediate material 104 obtained after the surface oxide film removing treatment at 400 to 500° C. in a gas soft nitriding atmosphere. The heating time can be determined appropriately The gas soft nitriding treatment is conventionally carried out at a temperature condition of approximately 580° C.

However, in the production method according to this embodiment, since the martensitic stainless steel material having a high content of chromium in comparison with other steel materials is used as the steel material, the dispersion of nitrides into the structure of the martensitic stainless steel and the precipitation of nitrides in the structure can be performed easily. In addition, since the martensitic stainless steel material, the structure of which hardly changes even if heated to a temperature of up to approximately 500° C., is used in the production method according to this embodiment, changes in dimensions and hardness can be suppressed without causing structural change by setting the heating retention temperature in the gas soft nitriding treatment to 500° C. or less.

Consequently, since the heating retention temperature in the gas soft nitriding treatment is set to less than 500° C. in the production method according to this embodiment, no finishing process is required to be carried out after the gas soft nitriding treatment, whereby the production processes can be simplified and the cost for the production can be reduced.

The atmospheric gas for use in the gas soft nitriding treatment is a mixture gas containing ammonia gas, nitrogen gas, hydrogen gas, carbon monoxide gas, carbon dioxide gas, etc.

Although the method for producing the engaging element has been taken as an example in this embodiment and described, the inner ring 71 and the outer ring 72 of the one-way clutch 7 can also be produced by using processes similar to those described above.

EXAMPLES

Although the present invention is described below in detail by taking the following examples, the present invention is not limited to these examples.

Example 1

A martensitic stainless steel (SUS440C) material was processed into a predetermined shape to obtain a rough shape material for the outer ring 72 [design dimensions (75 mm in inside diameter, 175 mm in thickness)] of the one-way clutch 7. The obtained rough shape material has a grinding allowance at the portion having an inner peripheral face formed thereon. Next, the portion having the inner peripheral face formed thereon in the obtained rough shape material was subjected to a grinding process and then to a super-finishing process so as to be finished to a predetermined accuracy to obtain an intermediate material.

Figure 5:
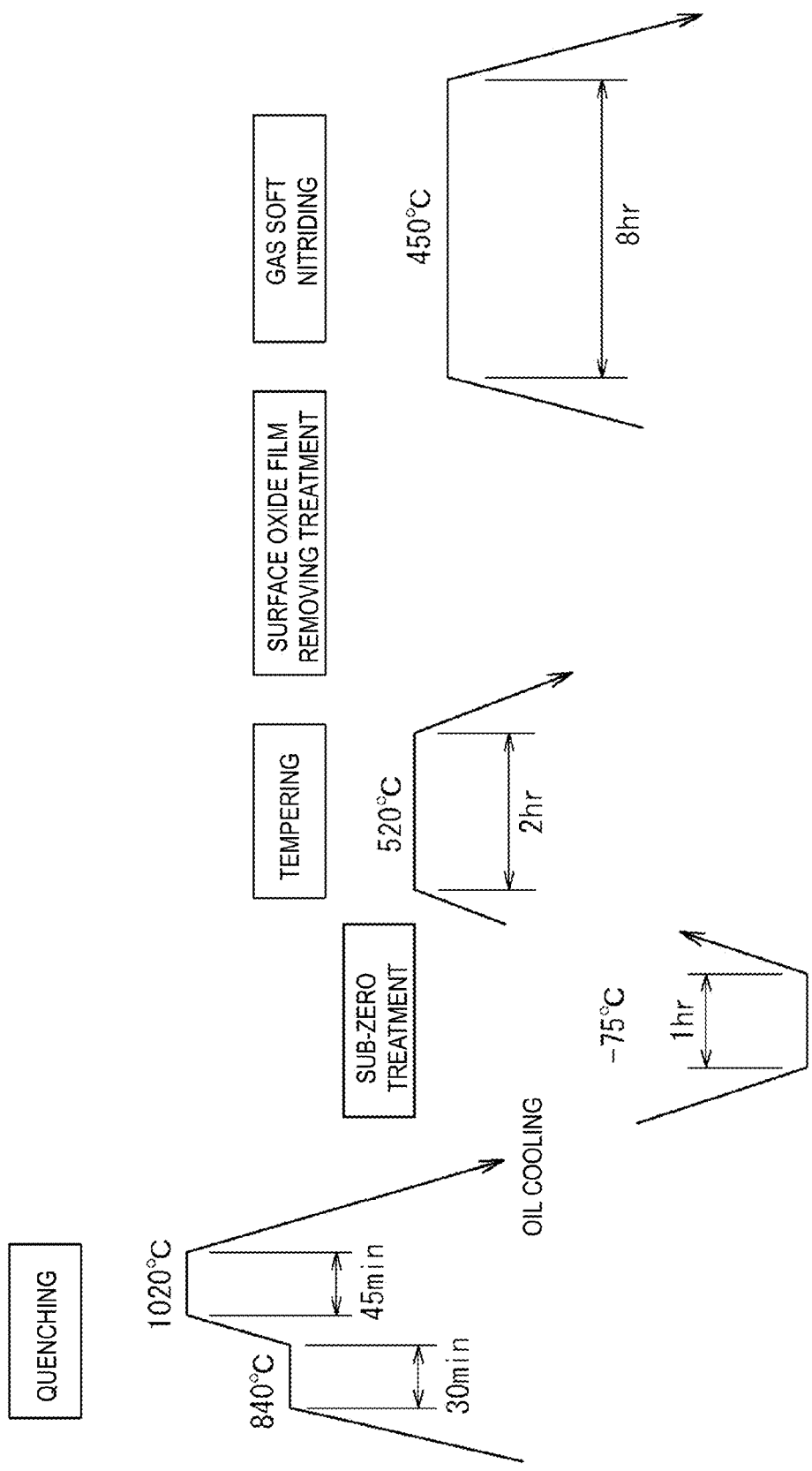
FIG. 5 is a diagram showing heat treatment conditions and the like in Example 1.

The obtained intermediate material was subjected to the heat treatment shown in FIG. 5. More specifically, the intermediate material was subjected to the quenching treatment in which the material was heated at 840° C. for 30 minutes and at 1020° C. for 45 minutes and then cooled rapidly in an oil bath. Next, the obtained intermediate material was subjected to the sub-zero treatment in which the material was cooled at −75° C. for 60 minutes. Then, the obtained intermediate material was subjected to the tempering treatment in which the material was heated at 520° C. for 2 hours. The obtained intermediate material was left in a reducing-gas atmosphere to remove the oxide film formed on the surface of the portion having the inner peripheral face formed thereon in the intermediate material. Next, the intermediate material after the surface oxide film removing treatment was subjected to the gas soft nitriding treatment in which the material was heated at 450° C. for 8 hours in a gas soft nitriding atmosphere. Consequently, an outer ring was obtained. The dimensional change of the outer ring before and after the gas soft nitriding treatment was less than the tolerance (±20 μm).

Example 2

Figure 6:
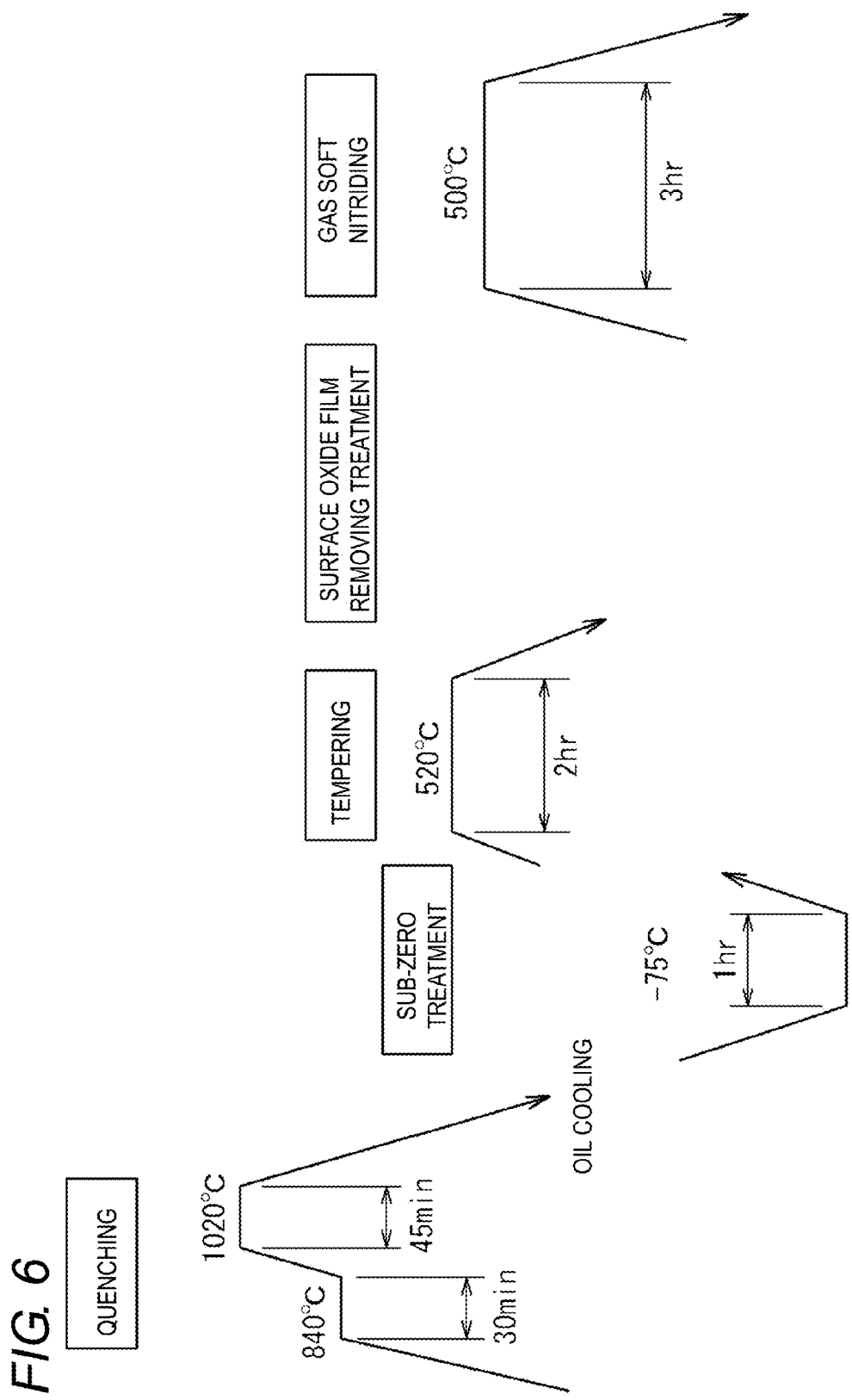
FIG. 6 is a diagram showing heat treatment conditions and the like in Example 2.

In Example 1, except setting the heating retention temperature to 500° C. and the heating retention period to 3 hours during the gas soft nitriding treatment, instead of setting the heating retention temperature to 450° C. and setting the heating retention period to 8 hours during the gas soft nitriding treatment, operations similar to those carried out in Example 1 were also carried out to obtain a test piece (outer ring). FIG. 6 shows the conditions of the heat treatment carried out in Example 2. The dimensional change of the outer ring before and after the gas soft nitriding treatment was less than the tolerance (±30 μm).

Test Example 1

The respective cross-sectional structures of the test pieces obtained in Examples 1 and 2 were observed with an electron microscope. Furthermore, the surface hardness distributions of the respective test pieces obtained in Examples 1 and 2 were examined. The surface hardness was measured according to JIS Z 2244.

Furthermore, the cross-sectional hardness distributions of the test pieces obtained in Examples 1 and 2 were examined. The cross-sectional hardness was measured according to JIS Z 2244 by using the cross-sectional structures of the respective test pieces.

Figure 7:
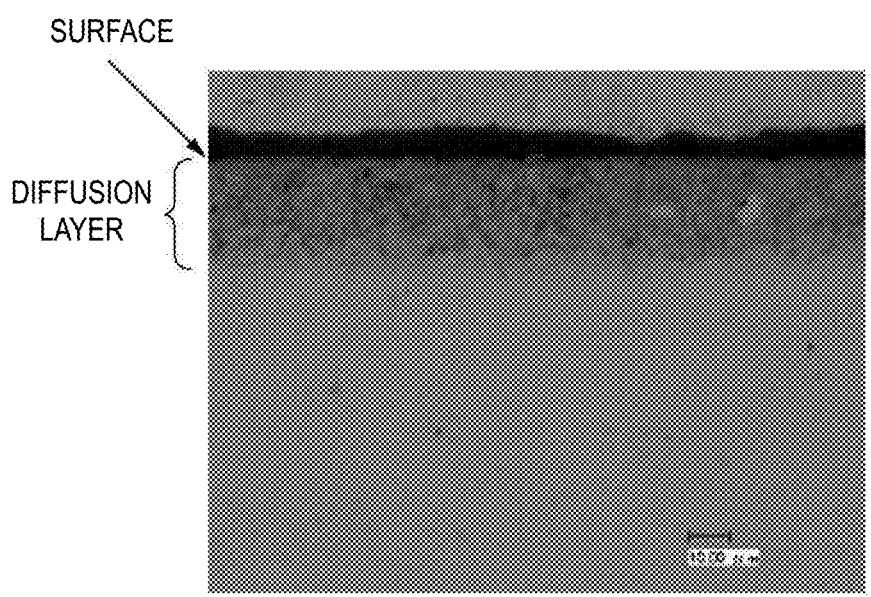
FIG. 7 is a photograph substituting a drawing showing the observation result of the cross-sectional structure of the test piece obtained in Example 1.
Figure 8:
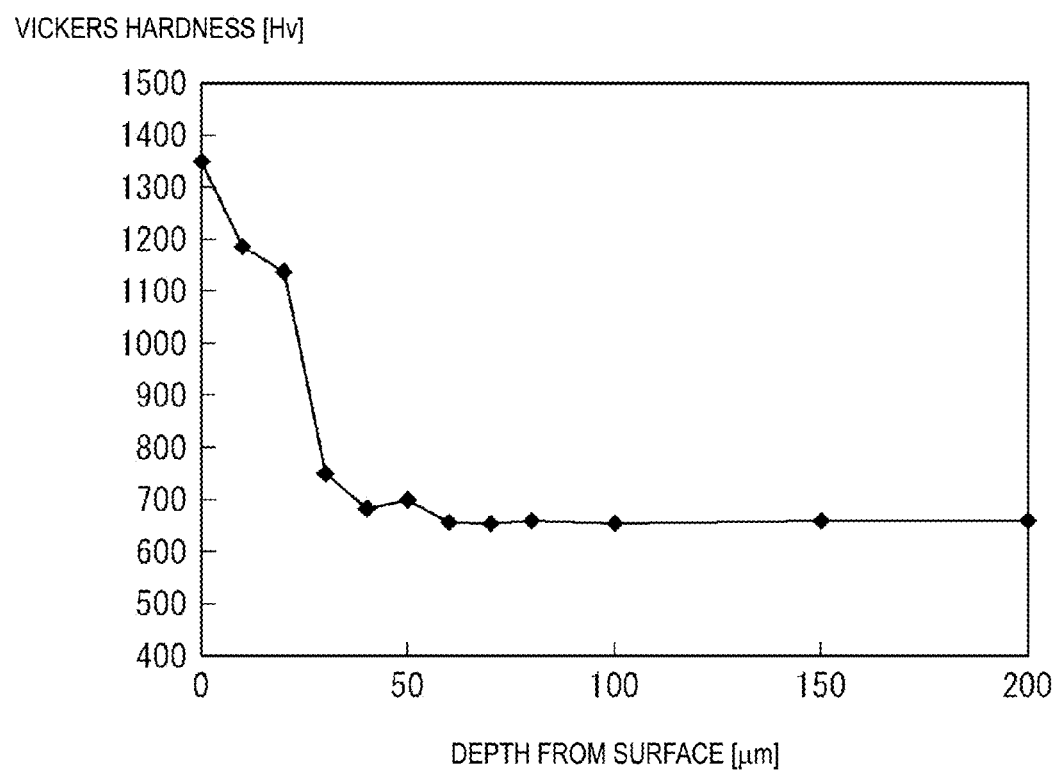
FIG. 8 is a graph showing the relationship between the Vickers hardness and the depth from the surface of the inner peripheral face of the test piece obtained in Example 1.
Figure 9:
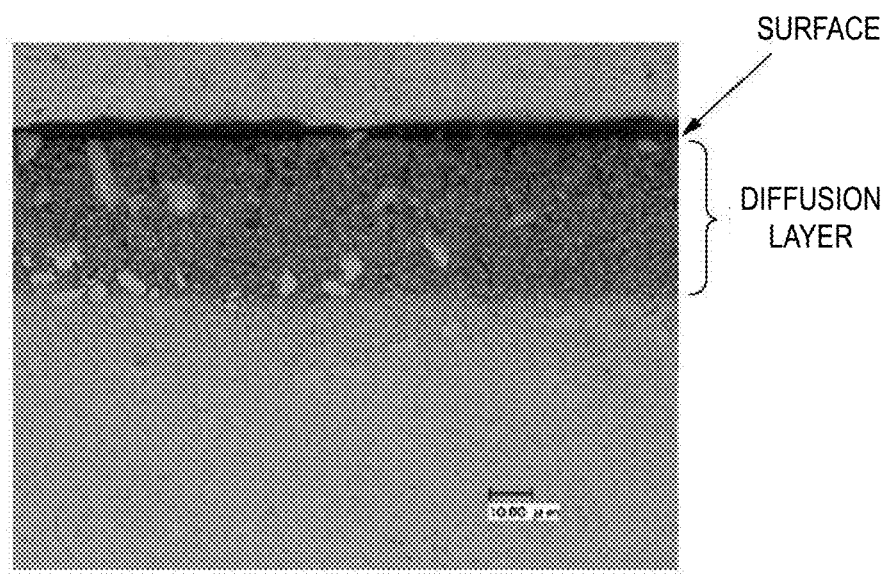
FIG. 9 is a photograph substituting a drawing showing the observation result of the structure of the test piece obtained in Example 2.
Figure 10:
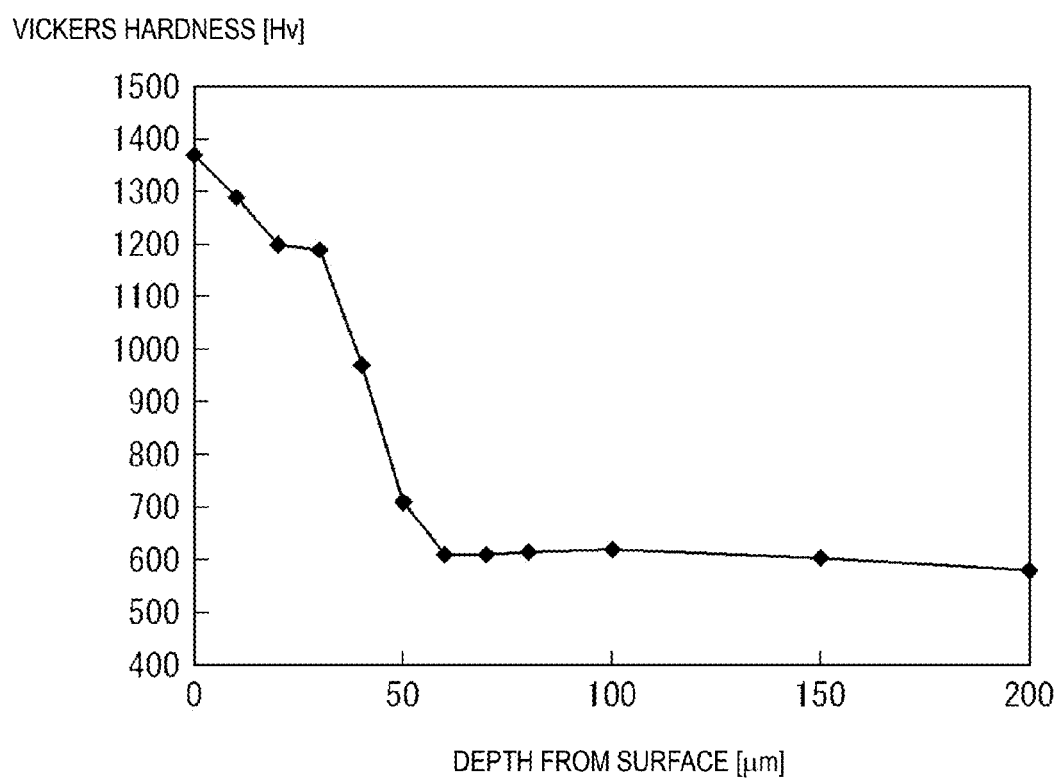
FIG. 10 is a graph showing the relationship between the Vickers hardness and the depth from the surface of the inner peripheral face of the test piece obtained in Example 2.

FIG. 7 shows the observation result of the cross-sectional structure of the test piece obtained in Example 1; FIG. 8 shows the examination result of the relationship between the Vickers hardness and the depth from the surface of the inner peripheral face of the test piece obtained in Example 1; FIG. 9 shows the observation result of the structure of the test piece obtained in Example 2; and FIG. 10 shows the examination result of the relationship between the Vickers hardness and the depth from the surface of the inner peripheral face of the test piece obtained in Example 2.

In Example 1 (see FIGS. 7 and 8) in which the surface oxide film removing treatment was carried out and then the gas soft nitriding treatment was carried out at the heating retention temperature of 450° C. as in the present invention, it is found that a diffusion layer is observed, that the Vickers hardness of the portion up to 20 μm from the surface is 1138 to 1348 Hv and the internal hardness of the portion at the depth of 50 μm or more from the surface is 658 Hv (approximately 58 HRC) or more, and that a compound layer is hardly observed on the surface (the upper portion of the diffusion layer).

Moreover, in Example 2 (see FIGS. 9 and 10) in which the surface oxide film removing treatment was carried out and then the gas soft nitriding treatment was carried out at the heating retention temperature of 500° C. as in the present invention, it is found that a diffusion layer is observed, that the Vickers hardness of the portion up to 20 μm from the surface is 1203 to 1370 Hv or more and the internal hardness is 580 Hv (approximately 54 HRC) or more, and that a compound layer is hardly observed on the surface (the upper portion of the diffusion layer).

The present application is based on Japanese Patent Application (patent application No. 2013-048937) filed on Mar. 12, 2013, and the contents thereof are herein incorporated by reference.

DESCRIPTION OF REFERENCE SIGNS

1: wind power generation device, 3: speed-up gear, 4: power generator, 5: input rotating body, 6: output rotating body, 7: one-way clutch, 8: rolling bearing (cylindrical roller bearing), 9: one-way clutch unit, 30: gear mechanism (rotation transmission mechanism), 35: output shaft, 38: roller bearing, 41: drive shaft, 42: rotor, 71*a*: contact portion (outer peripheral face of inner ring), 72*a*: contact portion (inner peripheral face of outer ring), 73: roller, S: space (wedge-shaped space)

The invention claimed is:

1. A one-way clutch for a wind power generation device, comprising:
    an inner ring provided on one rotating body out of an input rotating body provided so as to be integrally rotatable with an output shaft of a speed-up gear of a wind power generation device and an output rotating body provided so as to be integrally rotatable with a drive shaft of a power generator to which the rotation of the output shaft is transmitted and coaxially disposed radially inside or outside the input rotating body;
    an outer ring provided on the other rotating body and disposed radially outside the inner ring; and
    a plurality of engaging elements individually disposed in a plurality of spaces formed between both raceway faces of the inner ring and the outer ring,
    wherein, in a state in which a rotation speed of the input rotating body is higher than a rotation speed of the output rotating body, the engaging elements engage with both the raceway faces of the inner ring and the outer ring to connect the input rotating body to the output rotating body so that rotors of the input rotating body and the output rotating body are integrally rotatable, and in a state in which the rotation speed of the input rotating body is lower than the rotation speed of the output rotating body, the engaging elements release the engagement to cut off connection between the input rotating body and the output rotating body, and
    wherein the plurality of engaging elements or the inner ring and the outer ring are made of a base material obtained by subjecting a martensitic stainless steel material to soft nitriding treatment, and the base material has a Vickers hardness of 1000 to 1500 Hv for a portion up to 20 μm from a surface of a contact portion thereof that contacts a mating member that is in sliding or engagement therewith.

2. The one-way clutch for a wind power generation device according to claim 1,
    wherein an internal hardness of the contact portion is 54 HRC or more.

3. The one-way clutch for a wind power generation device according to claim 1,
    wherein the Vickers hardness of the portion up to 20 μm from the surface of the contact portion is 1150 to 1500 Hv.

4. The one-way clutch for a wind power generation device according to claim 1,
    wherein the engaging elements are cylindrical rollers or sprags, and a clearance is provided between the tip end portion of the input rotating body in an axial direction and an opposing face of the drive shaft opposing the tip end portion of the input rotating body in the axial direction and another clearance is provided between the tip end portion of the output rotating body in the axial direction and an opposing face of the input rotating body opposing to the tip end portion of the output rotating body in the axial direction, whereby the inner ring and the outer ring are allowed to move relatively in the axial direction, and
    wherein Vickers hardness of a portion up to 20 μm from a surface of a portion with which the engaging element relatively slides or engages when the input rotating body or the output rotating body expands or contracts in the axial direction due to temperature change is 1000 to 1500 Hv.

5. A one-way clutch unit for a wind power generation device, comprising:

the one-way clutch according to claim 1, and a rolling bearing which is provided adjacent to the one-way clutch and between the input rotating body provided so as to be integrally rotatable with the output shaft of the speed-up gear of the wind power generation device and the output rotating body provided so as to be integrally rotatable with the drive shaft of the power generator to which the rotation of the output shaft is transmitted and coaxially disposed radially inside or outside the input rotating body, and which supports the input rotating body and the output rotating body so that the rotating bodies are rotatable relatively to each other.

6. The one-way clutch unit for a wind power generation device according to claim 5, wherein the engaging elements are cylindrical rollers or sprags, and a clearance is provided between the tip end portion of the input rotating body in an axial direction and an opposing face of the drive shaft opposing the tip end portion of the input rotating body in the axial direction and another clearance is provided between the tip end portion of the output rotating body in the axial direction and an opposing face of the input rotating body opposing to the tip end portion of the output rotating body in the axial direction, whereby the inner ring and the outer ring are allowed to move relatively in the axial direction, and wherein Vickers hardness of a portion up to 20 μm from a surface of a portion with which the engaging element relatively slides or engages when the input rotating body or the output rotating body expands or contracts in the axial direction due to temperature change is 1000 to 1500 Hv.

7. The one-way clutch for a wind power generation device according to claim 2, wherein the Vickers hardness of the portion up to 20 μm from the surface of the contact portion is 1150 to 1500 Hv.

8. The one-way clutch for a wind power generation device according to claim 2, wherein the engaging elements are cylindrical rollers or sprags, and a clearance is provided between the tip end portion of the input rotating body in an axial direction and an opposing face of the drive shaft opposing the tip end portion of the input rotating body in the axial direction and another clearance is provided between the tip end portion of the output rotating body in the axial direction and an opposing face of the input rotating body opposing to the tip end portion of the output rotating body in the axial direction, whereby the inner ring and the outer ring are allowed to move relatively in the axial direction, and wherein Vickers hardness of a portion up to 20 μm from a surface of a portion with which the engaging element relatively slides or engages when the input rotating body or the output rotating body expands or contracts in the axial direction due to temperature change is 1000 to 1500 Hv.

* * * * *